United States Patent [19]

Covington et al.

[11] Patent Number: 4,807,271
[45] Date of Patent: Feb. 21, 1989

[54] FILM SHEET PRESENCE INDICATING MECHANISM FOR A PHOTOGRAPHIC CASSETTE

[75] Inventors: Roger G. Covington; Bruce R. Muller; Evan P. Carmichael; John J. Niedospial, all of Rochester, N.Y.

[73] Assignee: Eastman Kodak Company, Rochester, N.Y.

[21] Appl. No.: 125,418

[22] Filed: Nov. 25, 1987

[51] Int. Cl.⁴ .................................................. G03B 42/04
[52] U.S. Cl. ..................................... 378/182; 378/185; 378/187; 206/459
[58] Field of Search ............................. 378/182–188; 206/459; 354/276, 289.1

[56] References Cited

U.S. PATENT DOCUMENTS

| | | | |
|---|---|---|---|
| 3,703,272 | 11/1972 | Lareau | 378/187 |
| 3,784,835 | 1/1974 | Schmidt | 250/480 |
| 4,194,625 | 3/1980 | Stievenart et al. | 378/185 |
| 4,248,172 | 2/1981 | Kröbel et al. | 378/182 |
| 4,334,753 | 6/1982 | Harvey | 354/289.1 |
| 4,394,772 | 7/1983 | Okamoto et al. | 378/182 |
| 4,653,888 | 3/1987 | Komamura et al. | 354/276 |
| 4,744,100 | 5/1988 | Bauer et al. | 378/188 |

Primary Examiner—Craig E. Church
Assistant Examiner—John C. Freeman
Attorney, Agent, or Firm—James A. Smith

[57] ABSTRACT

A film sheet presence indicating mechanism is disclosed for use in a photographic cassette, such as an x-ray cassette having one end wall with a slot therein through which a film sheet is moveable therethrough between screens along an inlet path to a loaded position adjacent an opposite end wall. The x-ray cassette has front and rear cover walls joined to the end walls in which the rear cover wall has an inner side facing an inner surface of the front cover. The film sheet presence indicating mechanism comprises a housing secured to the inner side of the rear cover adjacent the opposite end wall to define a cavity. The mechanism further comprises a film sheet presence indicator member that is mounted within the housing cavity for slidable movement between a normal first position indicating the absence of a film sheet in the x-ray cassette, and a second position indicating that a film sheet is loaded in the cassette.

6 Claims, 3 Drawing Sheets

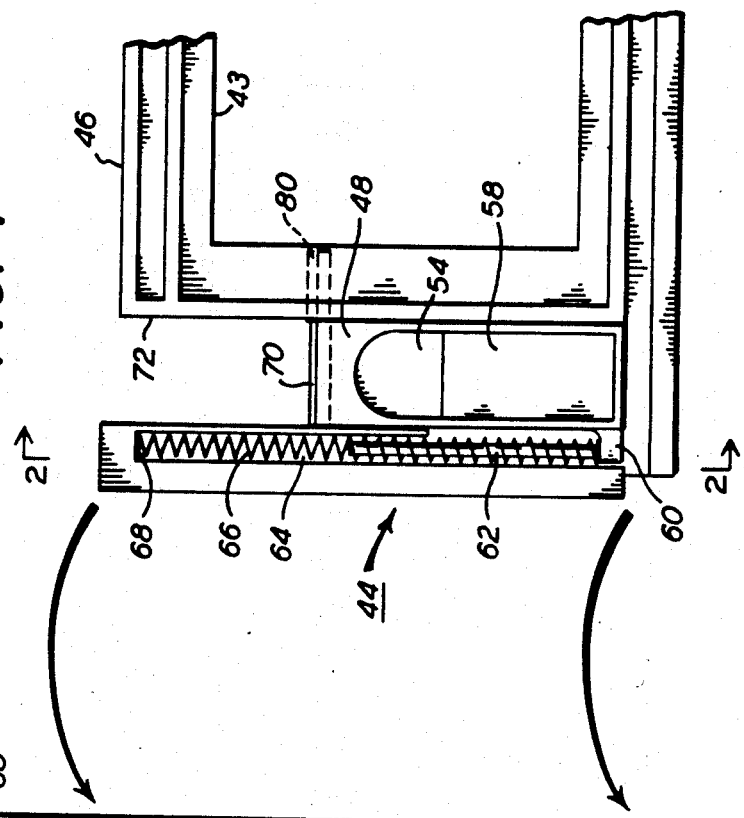
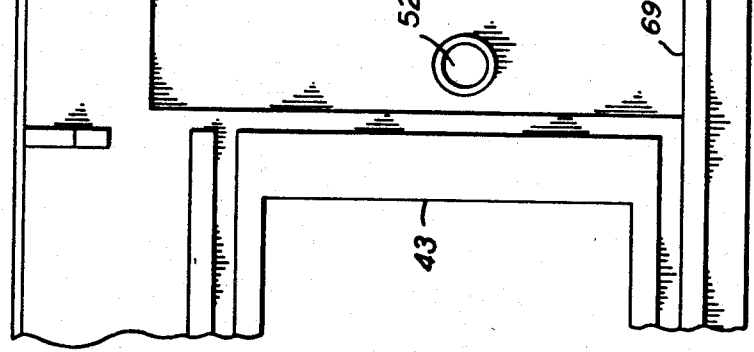

FILM SHEET PRESENCE INDICATING MECHANISM FOR A PHOTOGRAPHIC CASSETTE

BACKGROUND OF THE INVENTION

1. Field of the Invention

The present invention relates generally to photographic cassettes, and more particularly to a film sheet presence indicating mechanism for an x-ray cassette to indicate the presence or absence of a film sheet in the cassette.

2. Description of the Prior Art

Photographic cassettes having built-in indicators which enable an operator to visually check whether or not the cassette has been loaded with a film sheet are well known in the art. One of such built-in indicators is disclosed in U.S. Pat. No. 4,394,772 which issued to Okamoto et al on July 19, 1983. The built-in indicator comprises a pair of spaced plates, one of which is provided with a solar battery connected to a liquid crystal indicator. When the cassette is empty of film, the plates are in contact with one another causing shorting resulting in a blank indicator face. When the cassette is loaded with a film, the short-circuiting plates are isolated from each other by the film positioned therebetween resulting in the indicator face displaying the word "film".

Also, in U.S. Pat. No. 3,784,835, which issued to Schmidt on Jan. 8, 1974, simple and inexpensive means are disclosed for indicating whether the cassette contains a film sheet. One of the means disclosed in FIG. 4 comprises a window through which a flag carried by a pivotal lever can be seen. If the cassette contains a film sheet, the sheet will bear against the lever showing the flag through the window. Another means disclosed in FIG. 12 comprises a pin having a large head and a reduced shank. The shank extends through an opening in the bottom wall of the cassette. When the cassette is absent of film, the shank is free to ride up and down in the opening, limited only by the engagement of the head against a shoulder formed within the pressure plate. When a film sheet is loaded in the cassette, the leading end of the film sheet will rest on the head and therefore prevent inward movement of the pin. Thus, an operator can easily determine whether the cassette contains a film sheet merely by determining whether or not the pin is free to move in the opening.

A problem with the battery operated film sheet presence indicating mechanism is that the battery is constantly being drained of current while the cassette is unloaded resulting in a short battery life. Also, a dead battery would cause the indicator to indicate that a film is loaded even though the cassette may be unloaded. A possible problem with the pin-type film sheet presence indicator is that light may pass through the opening in the bottom wall of the cassette which may cause film fogging, resulting in the production of an inferior radiograph. A possible problem with both the pin-type and window-flag film sheet presence indicating mechanisms is that end curl in the leading end of the film sheet may cause the leading end to miss the lever or head resulting in the indication of an unloaded cassette, when in actuality, a loaded cassette should be indicated.

SUMMARY OF THE INVENTION

An object of the present invention is to provide a photographic cassette, such as an x-ray cassette with a built-in film sheet presence indicating mechanism that is of simple design and construction, thoroughly reliable in operation, and economical to manufacture. The x-ray cassette is of the type having one end wall with a slot therein through which a film sheet is moveable therethrough between screens along an inlet path to a loaded position adjacent an opposite end wall. The cassette has opposite side walls joining the end walls and opposing front and rear cover walls joined to the end and side walls in which one of the cover walls has an inner side facing an inner surface of the other cover. The film sheet presence indicating mechanism that is incorporated in the x-ray cassette comprises:

a housing secured to the inner side of the one cover wall adjacent the opposite end wall to define a cavity therebetween;

a film sheet presence indicator member mounted within the housing cavity for slidable movement between a normal first position indicating the absence of a film sheet in the x-ray cassette, and a second position indicating that a film sheet is loaded in the cassette, the indicator member having a depending flag at one end extending to the other cover wall, and adjacent first and second differently colored surfaces at the other end; and an opening extending through the one cover wall which is in alignment with the first colored surface in the normal first position of the indicator member, and which opening is in alignment with the second colored surface when a film sheet is moved along the inlet path to its loaded position within the x-ray cassette causing a leading edge thereof to engage the flag and slidably move the indicator member to its second position.

The object or objects of the present invention are further accomplished by a film sheet presence indicating mechanism having a frame member secured to the one cover wall adjacent the opposite end wall, and wherein the opening extends through the frame member. The film sheet presence indicating mechanism further comprises a stepped plate mounted on the inner surface of the other cover wall, the stepped plate having a higher step in register with and substantially engageable by the depending flag, and a lower step for supporting an end portion of one of the screens. The film sheet presence indicating mechanism further has a post extending along the length of the indicator member from one end thereof, and a helical spring encircling the post and having one end thereof engageable with the end of the indicator member, and the opposite end thereof engageable with the housing for biasing the indicator member into its normal first position.

BRIEF DESCRIPTION OF THE DRAWINGS

In the detailed description of the invention presented below, reference is made to the accompanying drawings, in which:

FIG. 3 is a segmental bottom view of the frame member shown in FIGS. 2a and 2b;

FIG. 4 is a segmental top plan view of the housing shown in FIGS. 2a and 2b.

DESCRIPTION OF THE PREFERRED EMBODIMENT

Because certain parts of photographic cassettes and related apparatus are well known, the following description is directed in particular to those elements forming, cooperating directly with, or relating to the present invention. Elements not specifically shown or described herein are selectable from those known in the art, particularly as shown in U.S. Pat. No. 4,444,484.

Figure 1:
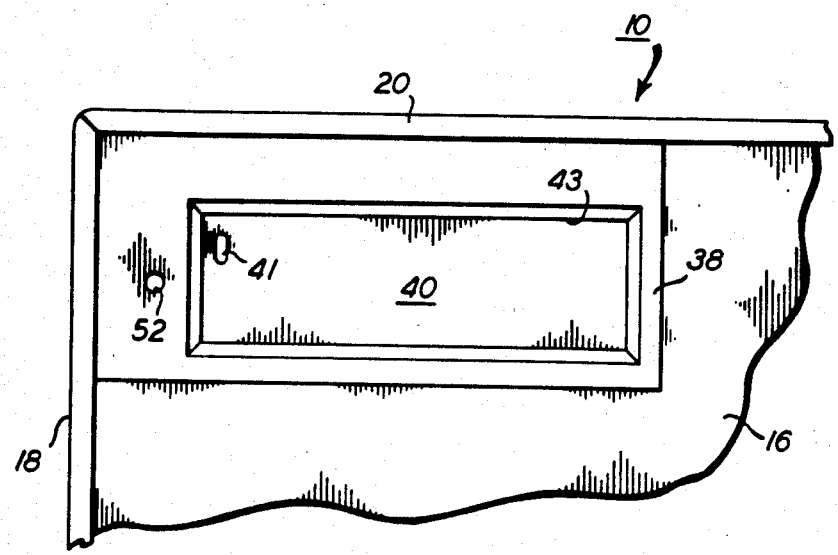
FIG. 1 is a top plan view of a portion of an x-ray cassette in which a preferred embodiment of a film sheet presence indicating mechanism of this invention is incorporated.
Figure 2A:
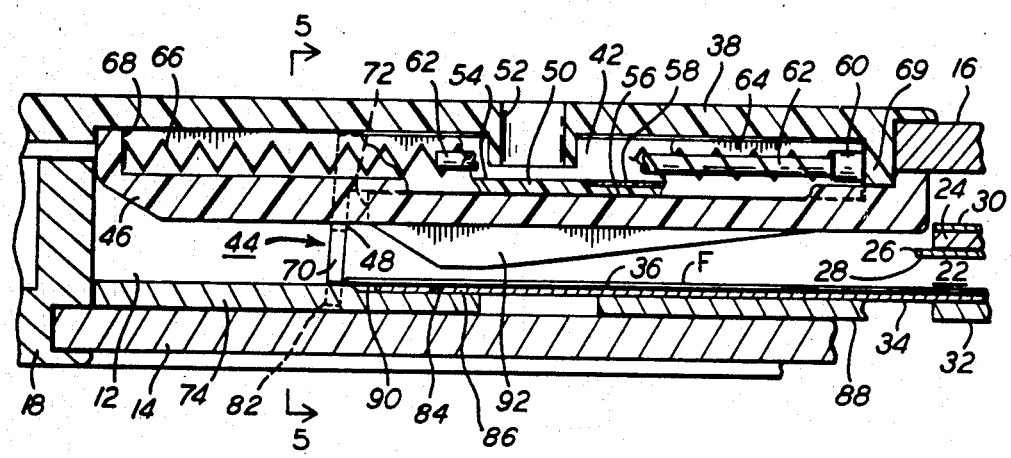
FIG. 2a is an enlarged segmental section view taken substantially along line 2—2 of FIG. 4 showing the indicating mechanism in its normal first position indicating the absence of film in the cassette.
Figure 2B:
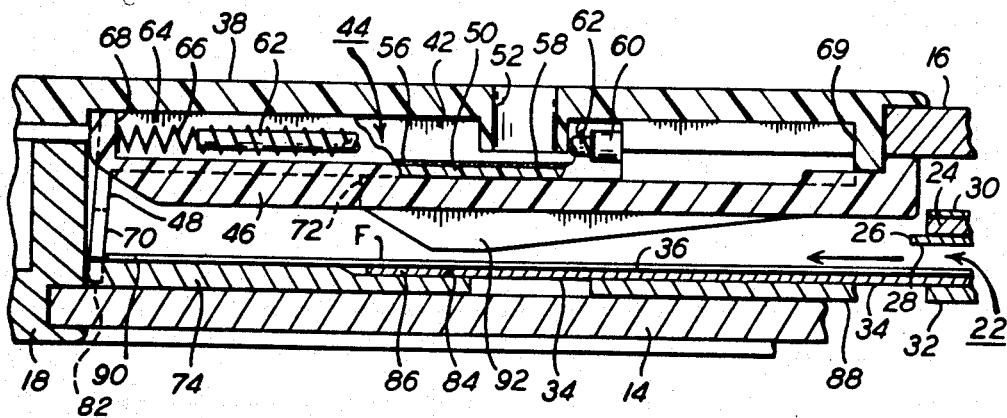
FIG. 2b is a view similar to FIG. 2a showing the indicating mechanism in its second position indicating that a film sheet is loaded in the cassette.

Illustrated in FIGS. 1, 2a and 2b is a photographic cassette 10 designed to hold a film sheet F for exposure when positioned in operative relation to a source of x-ray radiation. The cassette includes a rectangular-solid-shaped housing, only a corner portion of which is shown, defined by six opaque walls which are joined to enclose a chamber 12 for accommodating the film sheet. Opposing front and rear cover walls 14, 16 are spaced from and parallel with each other so that when the cassette is oriented for an exposure, front or tube cover wall 14 faces the radiation source and rear cover wall 16 lies behind the film sheet. Joined to front and rear cover walls 14, 16 are opposing side walls 18, only one of which is shown, and opposing end walls 20, only one of which is shown. The unshown end wall has a light-shielded elongate opening or slot, unshown, through which the film sheet F can pass along a film path 22 into and out of chamber 12.

Located inside chamber 12, as best seen in FIGS. 2a and 2b, a pressure plate 24 is located between and substantially parallel with front and rear cover walls 14, 16. The pressure plate 24 is made of magnesium or aluminum, and is mounted for movement toward and away from front cover wall 14. Secured to the front of pressure plate 24 is a sheet-like intensifier screen 26 similar in size and shape to film sheet F and having a forward-facing substantially planar surface 28. Coded onto the rear of pressure plate 24 is a layer of lead foil 30. Loosely placed onto the back of front cover wall 14 is a front floating plate 32 onto which a similar screen 34 is secured having a rearward-facing, substantially planar surface 36. Planar surfaces 28 and 36 thus face toward each other, so as to face opposite surfaces of film sheet F, when the film sheet is operatively disposed between screens 26, 34.

A rectangular shaped exposure window frame member 38 (FIG. 1) is provided in a corner of rear cover wall 16 defined by side wall 18 and end wall 20. The window frame member 38 extends through a cutout in pressure plate 24 and intensifier screen 26. The location of window frame member 38 is such that it does not interfere with the exposure of the major portion of the film F. An opaque slider 40 is slidably carried by window frame member 38 and has a recess 41 at one end thereof. The window frame member 38 and slider 40 are provided for applying patient identification data to the film sheet F by photographic projection techniques. Normally, slider 40 is in a closed position thus serving to close a window 43 in the window frame member 38 to protect the film from outside light which would cause fogging. When it is desired to add patient identification data to the film sheet by means of photographic projection, the cassette is inserted into a printer which includes a data holder spaced from the cassette position and an exposing unit. The printer may include a mechanism, not shown, for automatically engaging slider recess 41 and withdrawing slider 40 to its open position. After the window 43 is open, the exposing unit projects previously prepared data from the data holder through the window onto the film. After exposure, the slider closes the window, and the cassette may be removed from the printer.

With reference to FIGS. 2a, 2b and 3-5, a preferred embodiment of the film sheet presence indicating mechanism 44 of this invention for indicating whether or not a film sheet F has been loaded in cassette 10 will now be described. The indicating mechanism is located within a cavity 42 defined by window frame member 38 and a housing 46 secured to the undersurface of the window frame member. The film sheet presence indicating mechanism 44 generally comprises an L-shaped indicator member 48 in which one leg 50 thereof is mounted within cavity 42 for slidable movement between a normal first position indicating the absence of a film sheet F in the x-ray cassette, and a second position indicating that a film sheet F is loaded in the cassette. The leg 50 has a surface facing an opening 52 in frame member 38 in which one portion 54 of the surface is colored black and a recessed portion 56 of the surface is covered by a yellow tape 58. The leg 50 further has a laterally extending lip 60 at one end thereof having a post 62 laterally extending outwardly therefrom generally parallel to leg 50. The post 62 extends into a small elongated enclosure 64 adjacent cavity 42. A helical spring 66 encircles post 62 and has one end thereof engageable with lip 60, and the opposite end thereof bearing against a shoulder 68 of enclosure 64 formed by housing 46. Accordingly, spring 66 biases film sheet presence indicator member 48 into its normal first position, as seen in FIG. 2a, in which lip 60 engages a rib 69 on frame member 38 and frame opening 52 is in register with black surface 54 indicating to the operator that the cassette is unloaded. The indicator member 48 further has a depending leg or flag 70 that extends through an opening 72 in housing 46 toward front cover wall 14.

Figure 5:
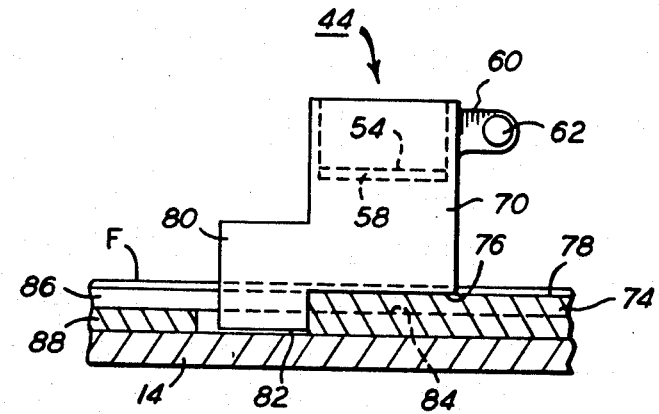
FIG. 5 is a section view taken substantially along line 5—5 of FIG. 2a with portions of the frame member and housing omitted to more clearly show the flag of the indicator member.

To assist in guiding film sheet F along the cassette film inlet path 22 into engagement with depending flag 70, a stepped plate 74 is mounted on the inner surface of front cover wall 14 in the corner of the cassette in register with depending flag 70, as best seen in FIGS. 2a, 2b and 5. The depending flag has a lower surface 76 thereof that substantially engages the upper surface 78 of the higher step of stepped plate 74. The depending flag 70 further has a laterally extending segment 80 having a lower surface 82 which substantially engages the inner surface of front cover wall 14. The lower surface 84 of the lowest step of stepped plate 74 supports an end portion 86 of the lower intensifier screen 34. The screen end portion 86 extending laterally outwardly from stepped plate 74 is further supported by a support plate 88 secured to front cover wall 14 of a thickness substantially equal to the height of lower surface 84 of the lower step. Accordingly, when a film sheet F is fed into cassette 10 along film inlet path 22 between screens 26, 34, the leading end 90 of film sheet F is directed by the supported screen end portion 86 and an inclined guide member 92 depending from housing 46 into engagement with depending flag 70 and reliably moves the flag against the bias of spring 66 to its second position seen in FIG. 2b, thereby moving the indicator member 48 so that frame opening 52 is now in register with yellow tape 58 for indicating to the operator that the cassette is loaded with a film sheet F.

The invention has been described in detail with particular reference to a preferred embodiment thereof, but it will be understood that variations and modifications can be effected within the spirit and scope of the invention.

What is claimed is:

1. In an x-ray cassette having one end wall with a slot therein through which a film sheet is moveable therethrough between screens along an inlet path to a loaded position adjacent an opposite end wall, opposite side walls joining the one end wall and the opposite end wall, and opposing front and rear cover walls joined to the end walls and side walls in which one of the cover walls has an inner side facing an inner surface of the other cover wall, a film sheet presence indicating mechanism for the x-ray cassette comprising:

a housing secured to the inner side of the one cover wall to define a cavity adjacent the opposite end wall;

a film sheet presence indicator member mounted within the housing cavity for slidable movement within the housing cavity between a normal first position indicating the absence of a film sheet in the x-ray cassette, and a second position indicating that a film sheet is loaded in the cassette, the indicator member having a depending flag at one end extending to the front cover, and adjacent first and second differently colored surfaces at the other end; and an opening extending through the one cover wall which is in alignment with the first colored surface in the normal first position of the indicator member, and which opening is in alignment with the second colored surface when a film sheet is moved along the inlet path to its loaded position within the x-ray cassette causing a leading edge thereof to engage the flag and slidably move the indicator member to its second position.

2. A film sheet presence indicating mechanism for an x-ray cassette according to claim 1 wherein a frame member is secured to the one cover adjacent the opposite end wall, wherein the housing is secured to the frame member to define the cavity therebetween, and wherein the opening extends through the frame member into the cavity.

3. A film sheet presence indicating mechanism for an x-ray cassette according to claim 2 wherein a plate is mounted on the inner surface of the other cover in register with and substantially engageable by the depending flag for guiding the film sheet along its inlet path into engagement with the flag.

4. A film sheet presence indicating mechanism according to claim 3 wherein the plate is a stepped plate having a higher step and a lower step in which the higher step is in register with and substantially engageable by the depending flag, and wherein the lower step supports an end portion of one of the screens.

5. A film sheet presence indicating mechanism for an x-ray cassette according to claim 4 wherein a spring is interposed between the film sheet presence indicator member and the housing for biasing the indicator member into its normal first position.

6. A film sheet presence indicating mechanism for an x-ray cassette according to claim 5 wherein the film sheet presence indicator member has a post extending from one end thereof along the length of the indicator member, and the spring comprises a helical spring encircling the post and having one end thereof engageable with the one end of the indicator member, and the opposite end of the spring engageable with the housing.

* * * * *